(12) United States Patent
Aoki et al.

(10) Patent No.: US 9,436,973 B2
(45) Date of Patent: Sep. 6, 2016

(54) COORDINATE COMPUTATION DEVICE AND METHOD, AND AN IMAGE PROCESSING DEVICE AND METHOD

(71) Applicant: MITSUBISHI ELECTRIC CORPORATION, Tokyo (JP)

(72) Inventors: Toru Aoki, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/785,801

(22) PCT Filed: May 23, 2014

(86) PCT No.: PCT/JP2014/063663
§ 371 (c)(1),
(2) Date: Oct. 20, 2015

(87) PCT Pub. No.: WO2014/208230
PCT Pub. Date: Dec. 31, 2014

(65) Prior Publication Data
US 2016/0078590 A1      Mar. 17, 2016

(30) Foreign Application Priority Data

Jun. 24, 2013    (JP) .................................. 2013-131439

(51) Int. Cl.
*G06K 9/36*      (2006.01)
*G06T 3/00*      (2006.01)
(Continued)

(52) U.S. Cl.
CPC . *G06T 3/00* (2013.01); *G06T 1/20* (2013.01); *G06T 3/0018* (2013.01); *G06T 5/001* (2013.01); *G06T 5/006* (2013.01); *H04N 5/23238* (2013.01); *H04N 5/2628* (2013.01)

(58) Field of Classification Search
None
See application file for complete search history.

(56) References Cited

U.S. PATENT DOCUMENTS

| 6,574,376 | B1 * | 6/2003 | Shiota | G06T 3/0018 |
| | | | | 382/285 |
| 2003/0103063 | A1 * | 6/2003 | Mojaver | G06T 3/00 |
| | | | | 345/647 |

(Continued)

FOREIGN PATENT DOCUMENTS

| JP | 2000-235645 A | 8/2000 |
| JP | 3126955 B2 | 1/2001 |

(Continued)

*Primary Examiner* — Li Liu
(74) *Attorney, Agent, or Firm* — Birch, Stewart, Kolasch & Birch, LLP

(57) ABSTRACT

In an image processing for correcting a distorted image obtained by photography by use of a super-wide angle optical system such as a fisheye lens or an omnidirectional mirror, to obtain an image of a perspective projection method, a composite index (Rn) combining a height on the projection sphere with a distance from the optical axis is computed (301), and a distance (Rf) from an origin in the distorted image is computed (302), using the composite index (Rn). Further, two-dimensional coordinates (p, q) in the distorted image are computed (303), using the distance (Rf) from the origin, and a pixel value in an output image is determined using a pixel at a position in the distorted image specified by the two-dimensional coordinates, or a pixel or pixels neighboring the specified position. It is possible to perform the projection from the projection sphere to the image plane, that is, the computation of the coordinates on the coordinate plane, while restricting the amount of computation.

8 Claims, 10 Drawing Sheets

(51) Int. Cl.
*G06T 5/00* (2006.01)
*H04N 5/232* (2006.01)
*H04N 5/262* (2006.01)
*G06T 1/20* (2006.01)

(56) References Cited

U.S. PATENT DOCUMENTS

2005/0265619 A1  12/2005  Ozaki
2009/0167886 A1*  7/2009  Tonomura ............. G06T 3/0031
        348/222.1
2012/0098926 A1*  4/2012  Kweon ............. H04N 5/23238
        348/36
2014/0314336 A1*  10/2014  Yagi ..................... G06T 3/0062
        382/282

FOREIGN PATENT DOCUMENTS

| JP | 2005-339313 A | 12/2005 |
| JP | 2008-48443 A | 2/2008 |
| JP | 2008-52589 A | 3/2008 |
| JP | 2008-301052 A | 12/2008 |
| JP | 2009-64225 A | 3/2009 |

* cited by examiner

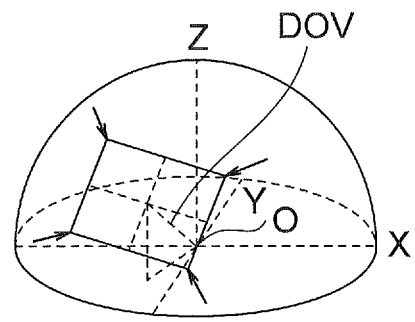
FIG. 6(a)   ZOOM MAGNIFICATION FACTOR m
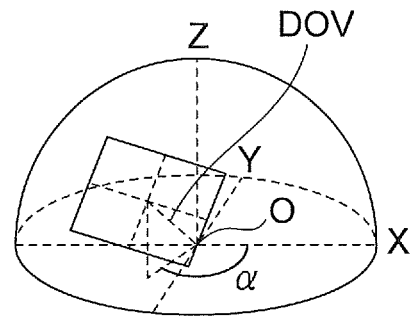
FIG. 6(b)   PAN ANGLE α
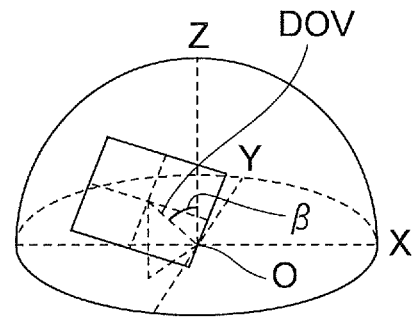
FIG. 6(c)   TILT ANGLE β
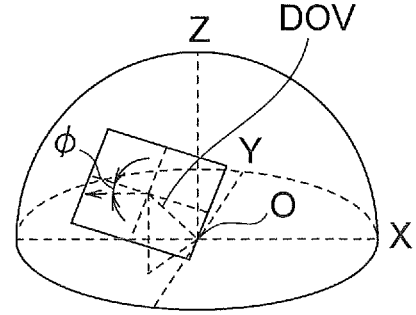
FIG. 6(d)   PLANE INCLINATION ANGLE φ

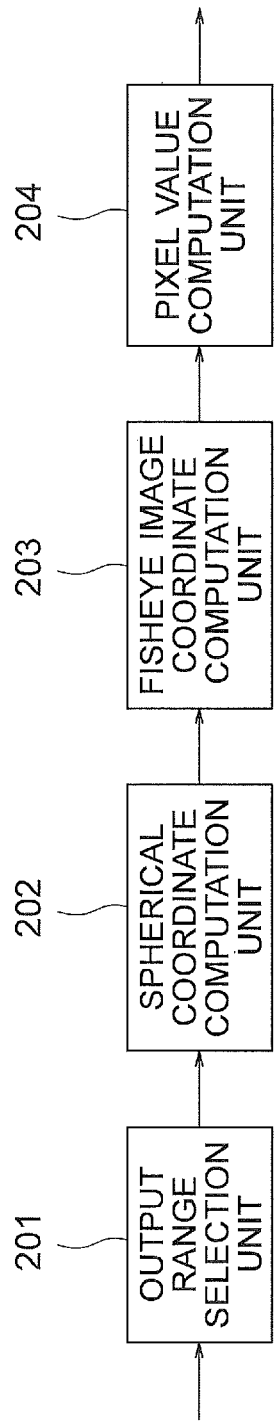

EXPRESSED BY ZENITH ANGLE $\theta$

EXPRESSED BY HEIGHT z

EXPRESSED BY DISTANCE r
FROM OPTICAL AXIS

COORDINATE COMPUTATION DEVICE AND METHOD, AND AN IMAGE PROCESSING DEVICE AND METHOD

TECHNICAL FIELD

The present invention relates to an image processing device and method for correcting a distorted image, obtained by photography with a super-wide angle optical system such as a fisheye lens or an omnidirectional mirror to obtain an image of a perspective projection method, and to a coordinate computation device and method used in such image processing device and method.

BACKGROUND ART

Super-wide angle optical systems such as fisheye lenses and omnidirectional mirrors can project an image with an angle of view of 180 degrees or more, onto a single image plane, and is used in various areas in which a wide photographic field of view is required.

In an image obtained toy photography using a super-wide angle optical system, the shapes of the captured objects appear distorted by barrel distortion, in comparison with an image of a normal perspective projection, so that the captured image (distorted image) gives an odd impression if it is displayed without alteration. Therefore, when a video obtained using a super-wide angle optical system is displayed, a region of interest, which is a part of the image, is extracted, and the extracted image is transformed to an image of a normal perspective projection method, before the display.

In this transformation, a projection surface (a projection sphere) on a hemispherical surface on one side of the image plane is assumed, and a projection is made from the projection sphere to the image plane. This projection includes a process of determining the position on the image plane corresponding to a point of interest on the projection sphere. Patent Reference 1 shows use of the zenith angle for the computation of the image height (distance from the optical axis) on the image plane, in this process (column 7). If the zenith angle is used, it is necessary to determine a trigonometric function of the zenith angle, when, for example, the projection is performed by orthographic projection, stereographic projection, or equisolid angle projection. Patent Reference 1 discloses the use of a lookup table for simplifying the process of determining the trigonometric function.

PRIOR ART REFERENCES

Patent References

Patent Reference 1: Japanese Patent No. 3126955

SUMMARY OF THE INVENTION

Problems to be Solved by the Invention

Use of the position in the direction of the optical axis (height) instead of the zenith angle may also be considered. When the height is used, the computation of the trigonometric function becomes unnecessary and the amount of computation can be reduced. However, in the vicinity of the zenith of the projection sphere, the variation in the height for a given variation in the zenith angle becomes small, and it is necessary to increase the number of bits of the data representing the height in the vicinity of the zenith, in order to perform the computation with the desired precision.

Use of the distance from the optical axis can also be considered. In this case as well, the computation of the trigonometric function becomes unnecessary, and the amount of computation can be reduced. However, in the vicinity of the rim of the projection sphere, the variation in the distance from the optical axis for a given variation in the zenith angle becomes small, and it is necessary to increase the number of bits of the data representing the distance from the optical axis in the vicinity of the rim, in order to perform the computation with the desired precision. p The present invention addresses the problems described above, and its object is to enable projection from the projection sphere to the image plane, that is, computation of the coordinates, on the coordinate plane, with high precision, while restricting the amount of the computation.

Means for Solving the Problem

A coordinate computation device according to the present invention transforms three-dimensional coordinates on a projection sphere to two-dimensional coordinates on a distorted image, and comprises:

a composite index computation unit tor computing a composite index which is a combination of a height of a point of interest on the project ion sphere and a distance of the point of interest from an optical axis which are obtained from said three-dimensional coordinate;

a distance computation unit for computing a distance from an origin in said distorted image, of a point in said distorted image corresponding to said point of interest, from said composite index; and a coordinate computation unit for computing the two-dimensional coordinates in said distorted image, from the distance from said origin in said distorted image.

Effect of the Invention

According to the present invention, the composite index, which is a combination of the height on the projection sphere and the distance from the optical axis, is used, so that the computation of the coordinates can be made with high precision, with a small number of bits.

BRIEF DESCRIPTION OF THE DRAWINGS

FIGS. 6(*a*) to (*d*) are diagrams showing a room magnification factor, a pan angle, a tilt angle, and a plane inclination angle.

FIG. 7 is a block diagram showing an example of the configuration of an image correction processing unit in the image processing device in FIG. 1.

MODE FOR CARRYING OUT THE INVENTION

First Embodiment

Figure 1:
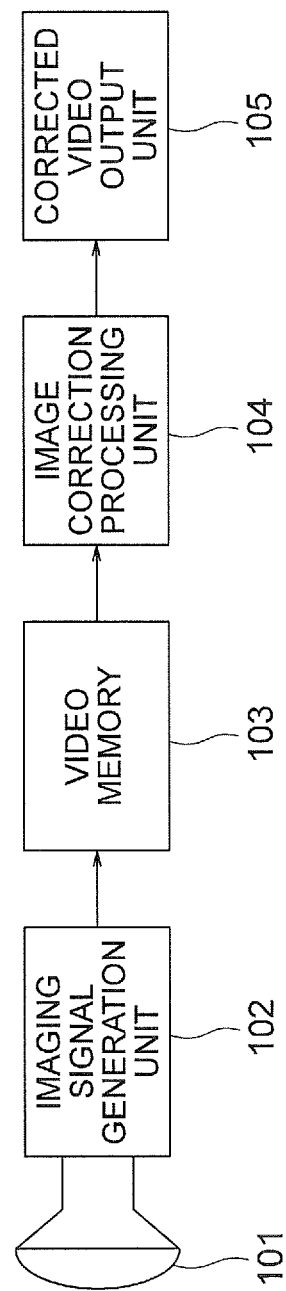
FIG. 1 is a block diagram showing an example of the configuration of an imago processing device according to the present invention.

FIG. 1 shows an image processing device in a first embodiment of the present invention. The illustrated image processing device has a fisheye lens 101 as an example of a super-wide angle optical system, an imaging signal generation unit 102, a video memory 103, an image correction processing unit 104, and a corrected video output circuit 105.

Figure 2:
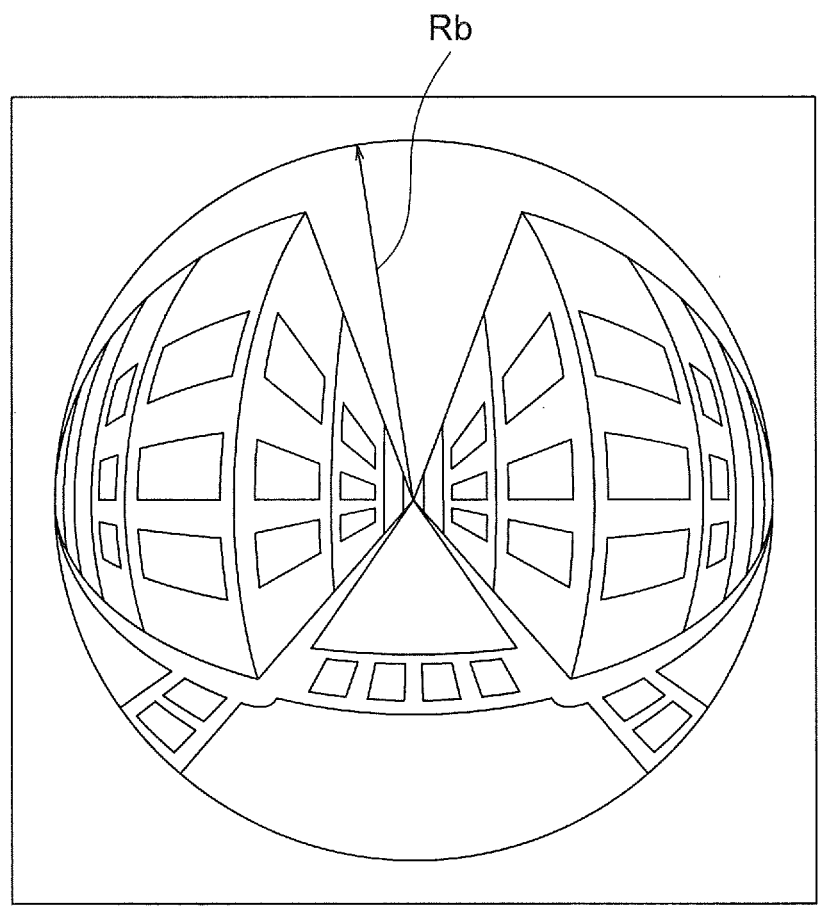
FIG. 2 is a diagram showing an example of a fisheye image.

The fisheye lens 101 optically captures an image with a wide angle of view, and, for example, a circular distorted image like the one shown in FIG. 2 is obtained. The circular image in FIG. 2 is an image of the objects within a range of the angle of view of up to 180 degrees. FIG. 2 shows, in a simplified manner, an image obtained when photography is made from an intersection of streets, in the direction of one of the streets. In the following description, a distorted image captured by use of the fisheye lens 101 is referred to as a fisheye image.

Imaging with a fisheye lens will be described below with reference to FIG. 3.

It will be assumed that there are an image plane F perpendicular to the optical axis AL of the fisheye lens 101, and a projection surface (projection sphere) S on a hemisphere centered at the point of intersection O of the image plane F and the optical axis AL, and positioned on the object side (photographed space side) of the image plane F, with its bottom surface coinciding with the image plane.

It can be considered that all light from the object propagates toward the above-mentioned center O, and is projected onto the projection sphere S, and is then projected from the projection sphere S onto the image plane F.

The projection from the projection sphere S to the image plane F is carried out by one of the orthographic projection method, the stereographic projection method, the equidistance projection method, the equisolid angle projection method and so on. The method by which the projection is carried out differs depending on the fisheye lens 101 that is used.

Figure 3:
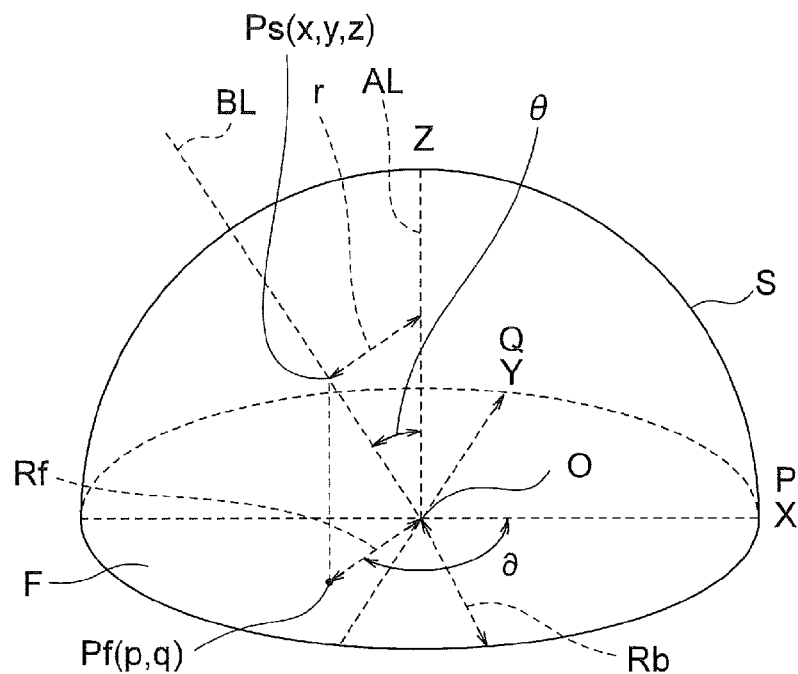
FIG. 3 is a diagram showing a projection from an object to a projection sphere, and a projection from the projection sphere to an image plane.

FIG. 3 shows a case in which light from a direction indicated by a dotted line BL is projected onto a point Ps on the projection sphere S, and is then projected onto a point Pf on the image plane F.

The position of the point Pf on the image plane F is represented by two-dimensional coordinates (p, q). These two-dimensional coordinates represent the positions in the directions of the two coordinate axes, that is, a P axis and a Q axis of the image plane F, that extend in two directions which are perpendicular to each other.

Figure 4:
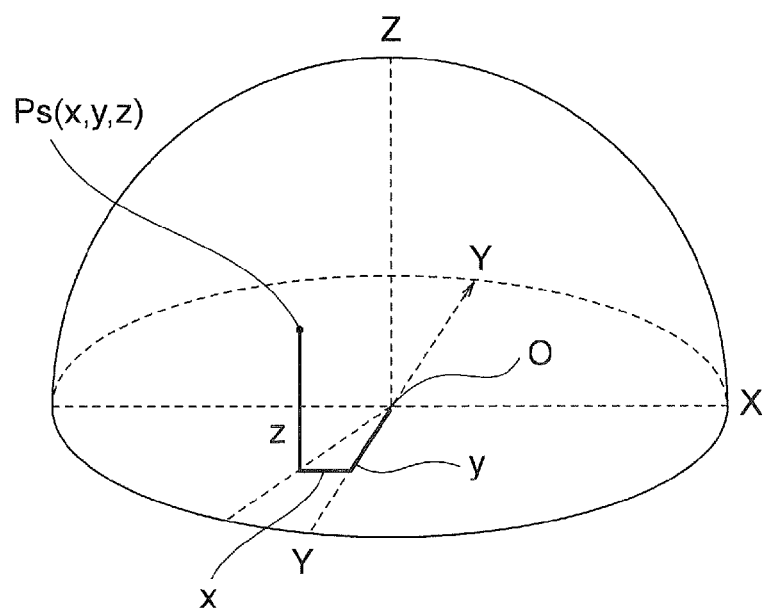
FIG. 4 is a diagram showing x, y, z coordinate values on the projection sphere.

The position of the point Ps on the projection sphere S is represented by three-dimensional coordinates (x, y, z). These three-dimensional coordinates have their origin at the point of intersection O of the image plane F and the optical axis AL (accordingly, the center of the bottom surface of the above-mentioned hemisphere), and represent positions in the directions of a Z axis, which is a coordinate axis extending in the direction of the optical axis AL, and an X axis and a Y axis which are coordinate axes respectively coinciding with the P axis and the Q axis on the image plane P. In FIG. 4, the magnitudes of the x, y, z coordinate values are shown separately.

The position of the point Ps can also be represented by a zenith angle $\theta$ and an azimuth angle $\partial$.

The zenith angle $\theta$ of the point Ps is an angle of inclination from the optical axis AL, or in other words, the angle formed by the straight line connecting the point Ps and the origin O, and the optical axis AL.

The azimuth angle $\partial$ of the point Ps is an angle in the direction of rotation about the optical axis, and is referenced to the direction of the X axis, for example.

The projection from the projection sphere S to the image plane F is carried out in such a way that the azimuth aegis does not change. The azimuth angle of the point Pf is therefore identical, to the azimuth angle of the point Ps, and is denoted by the reference character $\partial$.

The relationship between the distance Rf from the optical axis AL to the point Pf (accordingly, the distance from the origin O to the point Pf), and the distance r from the optical axis AL to the point Ps differs depending on the projection method.

That is, the relationship between the zenith angle $\theta$ of the point Ps and the distance Rf from the optical axis AL to the point Pf differs depending on the projection method as follows. For example, in the case of the orthographic projection method, there is a relationship:

$$Rf = Rb \times \sin\theta \qquad (1)$$

while in the case of the stereographic projection, there is a relationship:

$$Rf = Rb \times 2 \times \tan(\theta/2) \qquad (2)$$

In the above-mentioned formulas, Rb is the radius of the projection sphere S. The radius Rb of the circular fisheye image shown in FIG. 2 (the distance from the center of the image to a point with an angle of view of 180degrees) is equivalent to the radius of the projection sphere S.

Also, the relation between the zenith angle $\theta$ and the distance r from the optical axis AL to the point Ps is:

$$r = Rb \times \sin\theta \qquad (3)$$

Accordingly, in the case of the orthographic projection method, there is a relation:

$$Rf = r \qquad (4)$$

while in the case of the stereographic projection method, there is a relation:

[Mathematical Expression 1]

$$Rf = 2Rb \cdot \tan\left(\frac{\theta}{2}\right) = 2Rb \cdot \tan\left(\frac{\sin^{-1}\frac{r}{Rb}}{2}\right) \qquad (5)$$

The imaging signal generation unit 102 includes an imaging element formed, for example of a CCD, having the image plane F as shown in FIG. 3, and generates an electrical image signal representing an optical image.

The video memory 103 stores the image signal generated toy the imaging signal generation unit 102 in units of frames.

The image correction processing unit 104 reads the image signal stored in the video memory 103, corrects the fisheye image represented by the image signal, and outputs the corrected image. In the correction, a partial region of the fisheye image, that is, a region including a position in the fisheye image, corresponding to a direction of view DOV shown in FIG. 5, and the positions surrounding it (the part of the fisheye image generated by light from the direction of view DOV and its surrounding directions) is selected, and the selected image is transformed to an image of a perspective projection method. The image resulting from the correction by the image correction processing unit 104 will be referred to below as an 'output image'.

Figure 5:
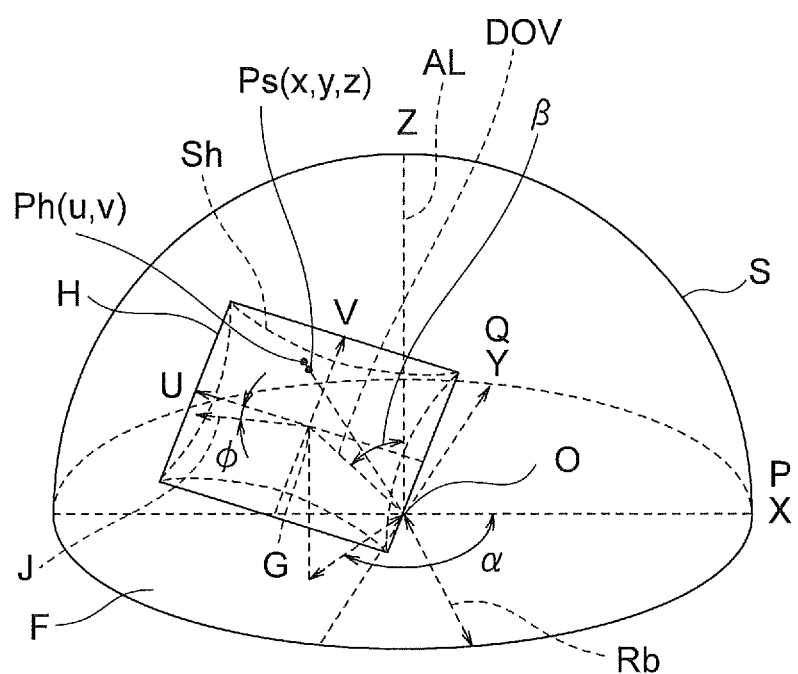
FIG. 5 is a diagram showing positional relationships among the image plane, the projection sphere, and an output image plane.

The output image is an image obtained by a perspective projection of the image on the projection sphere S to a plane (output image plane) H, as shown in FIG. 5, and is denoted by the same reference character H as the output image plane.

The plane H is tangent to the projection sphere S at the point of intersection G of the straight line indicating the direction of view DOV and the projection sphere s. The position of a point Ph on the plane (output image plane) H is represented by coordinates (u, v) having their origin at the point of tangency G with the projection sphere S. The coordinates (u, v) represent the positions in the directions the U axis and the V axis which are mutually perpendicular coordinate axes on the output image plane H.

The U axis forms an angle $\phi$ with the rotation reference axis J. The rotation reference axis J passes through the origin G, is parallel to the XY plane, and perpendicular to the straight line OG (the straight line connecting the origin O and the origin G). The angle $\phi$ will be referred to as a plane inclination angle or a rotation angle.

The azimuth angle $\partial$ of the origin G will be referred to as a pan angle, and is denoted by a reference character $\alpha$. The zenith angle $\theta$ of the origin G will be referred to as a tilt angle, and denoted by a reference character $\beta$. The size of the output image, that is, the angle of view of the output image (electronic zoom angle of view) can be varied by a magnification factor (zoom magnification factor) m. The change in the size of the output image according to the change in the zoom magnification factor is conceptually illustrated in FIG. 6(a). FIGS. 6(b), (c), and (d) separately show the pan angle $\alpha$, the tilt angle $\beta$, and the plane inclination angle $\phi$ for the same output image plane H as that shown in FIG. 5.

In the projection of the image from the projection sphere S to the output image plane H, the point Ps(x, y, z) on the projection, sphere S is projected to the point Ph(u, v) at which the straight line passing through the point Ps and the origin O intersects the output image plane H.

To generate the above mentioned output image (the image projected to the output image plane H), the image correction processing unit 104 computes the position in the fisheye image corresponding to the position of each pixel (pixel of interest) in the output image, computes the pixel value of the above-mentioned pixel of interest in the output imago based on the pixel value of the pixel at the computed position in the fisheye image, or the pixel value or values of the pixel or pixels in the neighborhood of the above-mentioned pixel of interest, and generates the image by an array of pixels having the computed pixel values.

The corrected video output circuit 105 outputs the signal of the corrected image in the form of a normal television video signal, such as a video signal of an NTSC format. Incidentally, this signal may be encoded by an encoding device, and transmitted to a remote location, at which a video display may be made.

The image correction processing unit 104 has, for example, an output range selection unit 201, a spherical coordinate computation unit 202, a fisheye image coordinate computation unit 203, and a pixel value computation unit 204, as shown in FIG. 7.

The image correction process carried cut by the image correction processing unit 104 will be described with reference to FIG. 5, and FIGS. 8(a) and (b).

The output range selection unit 201 selects the range of the output image by selecting the desired direction of view DOV, that is, the desired pan angle $\alpha$ and the desired tilt angle $\beta$, and also selecting the desired plane inclination angle $\phi$, and the desired size of the output image, that is, the desired zoom magnification factor m. The selection is made according to, for example, user operations. Alternatively, the range of the output image may be automatically varied over time.

Figure 8A:
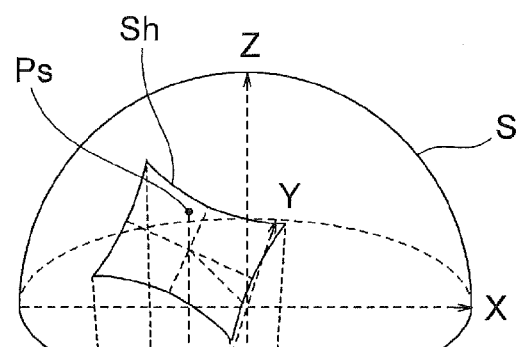
FIGS. 8(a) and (b) are diagrams showing a summary of an image correction process.

The selection of the output range by the output range selection unit 201 (FIG. 8(a)) is equivalent to determining or varying the direction of view and determining or varying the rotation angle by mechanical pan, tilt, of the camera, determining or varying the rotation angle (the plane inclination angle), and determining or varying the magnification factor by an optical zoom, and the process performed by the output range selection unit 201 may also be referred to as an electronic PTZ (pan, tilt, and zoom) process.

The spherical coordinate computation unit 202 projects the output image H having its range selected by the output range selection unit 201, onto the projection sphere S, as shown in FIG. 5, and computes the three-dimensional coordinates of the point on the projection sphere S corresponding to each point in the output image H. The computation of the three-dimensional coordinates is a process of determining the position (x, y, z) on the projection sphere S corresponding to, for example, the position of each point, for example, (u, v), in the output image H. The position on the projection sphere S corresponding to each point Ph in the output image is the position of the point of intersection of a straight line connecting the above-mentioned each point Ph and the origin of and the projection sphere S. The range on the projection sphere S corresponding to the output image H is denoted by reference characters Sh in FIG. 5 and FIG. 8(a).

Figure 8B:
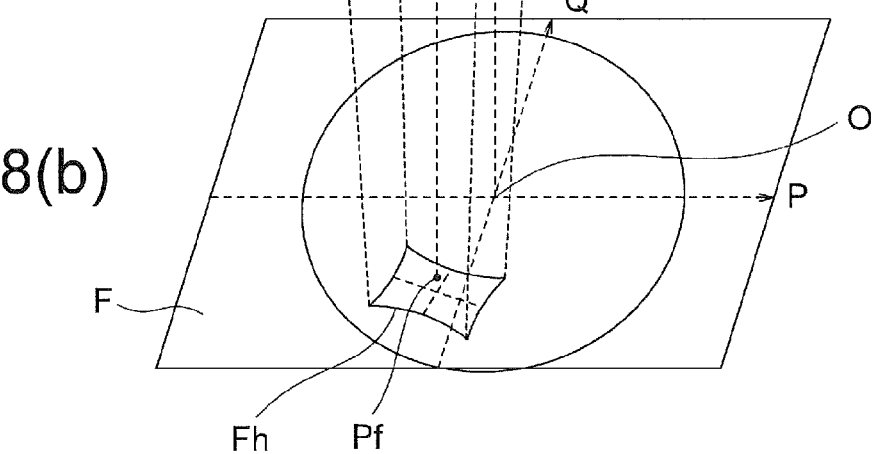

The fisheye image coordinate computation unit 203 projects the image (the image on the projection sphere) in the range Sh shown in FIG. 8(a) onto the fisheye image as shown in FIG. 8(b), thereby to compute the fisheye image coordinates. This projection is a process of determining the position in the fisheye image, that is, the position (p, q) on the image plane F, corresponding to the position (x, y, z) of each point Ps on the projection sphere S. The range (extracted range) in the fisheye image (denoted by the same reference character W as the image plane) corresponding to the range Sh is denoted by reference characters Fh in FIG. 8(b).

The method by which rise projection from the projection sphere S to the fisheye image can be made by any of various methods such as those of the orthographic projection, the equidistance projection, the stereographic projection, the equisolid angle projection, and so on, and is determined depending on the projection method of the fisheye lens.

The pixel value confutation unit 204 computes the pixel value of each pixel in the output image in FIG. 5. In the computation of the pixel value, it uses the pixel value of the pixel at the position (p, q) in the fisheye image corresponding to the position (u, v) of each pixel (pixel of interest) in the output image in FIG. 5, or the pixel value(s) of the pixel(s) in the neighborhood of the position (p, q) (neighboring pixel(s)). That is, if there is a pixel at the position in the fisheye image corresponding to the position of the above-mentioned pixel of interest, the pixel value of that pixel is used, as the pixel value of the above-mentioned pixel of interest, and if there is no pixel at the position in the fisheye image corresponding to the pixel of interest, the pixel value of the above-mentioned pixel of interest is determined by interpolation from the pixel value or values of one or more pixels in the neighborhood of the above-mentioned corresponding position in the fisheye image.

When the projection from the projection sphere S to the image plane F is carried out in the projection fisheye image coordinate computation unit 203, a composite index obtained by combining the height with the distance from the optical axis is used, according to the present invention. The reason for using the above-mentioned composite index will be explained, after explaining the problems regarding this point.

In general, for determining the image height in the fisheye image F in this projection, use of the zenith angle, use of a value (height) representing the position in the direction of the optical axis, and use of the distance from the optical axis may be considered.

Figure 9A:
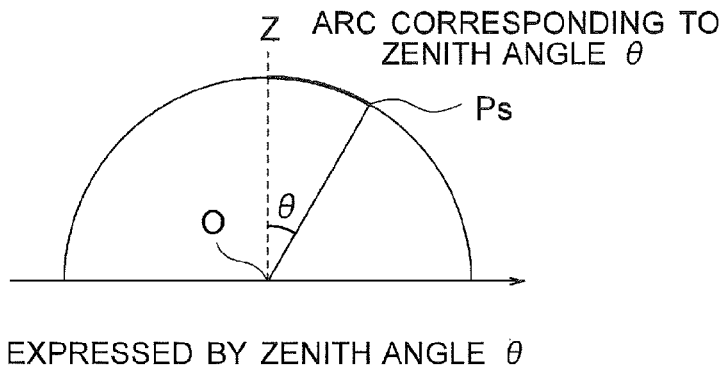
FIGS. 9(a) to (c) are diagrams showing examples of a zenith angle, a height, and a distance from the optical axis of a point of interest on the projection sphere.

For example, the zenith angle is used in Patent Reference 1 (FIG. 1, and Column 7 in the above-mentioned patent reference), as shown in FIG. 9(a). The zenith angle θ can be expressed with the same precision by the data of the same bit width both in the vicinity of the zenith of the projection sphere, and in the vicinity of the rim of the projection sphere (image plane). If the zenith angle is used, however, it is necessary to compute a trigonometric function when the method for projection from the projection sphere to the fisheye image is the orthographic projection method, the stereographic projection method, or the equisolid angle projection method. In Patent Reference 1, a lookup table is used to simplify the computation of the trigonometric function.

Figure 9B:
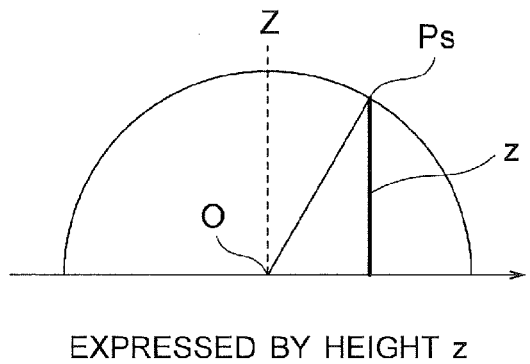

It may also be considered to use, in place of the zenith angle, the position (height) to the direction of the optical axis, that is, the coordinate value x, shown in FIG. 9(b). When the height is used, the computation of the trigonometric function becomes unnecessary, and the amount of computation can be reduced. In the vicinity of the zenith of the projection sphere, however, the variation in the height for a given variation in the zenith angle becomes small, and many bits of precision are needed only in the vicinity of the zenith. (Data of a larger bin width needs to be used to perform the computation with the same precision.) For example, when the zenith angle varies from 89 degrees to 90 degrees in the vicinity of the rim, the variation in the height is approximately $1.745 \times 10^{-2}$, while when the zenith angle varies from 0 degrees to 1 degree in the vicinity of the zenith, the variation in the height is approximately $1.523 \times 10^{-4}$, so that the precision differs by a factor of about 100.

Figure 9C:
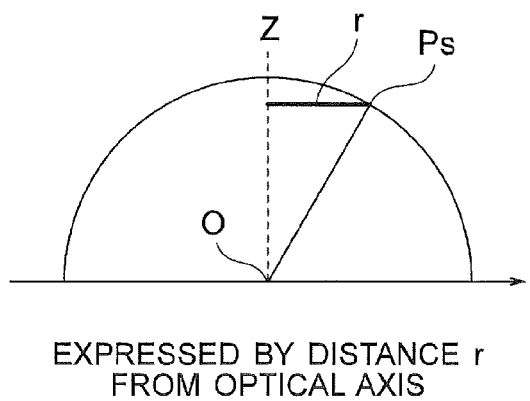

It may also be considered to use the distance from the optical axis, as shown in FIG. 9(c). In this case as well, the computation of the trigonometric function becomes unnecessary and the amount of computation can be reduced. In the vicinity of the rim of the projection sphere, however, the variation in the distance from the optical axis for a given variation in the zenith angle becomes small, so that many bits of precision are needed only in the vicinity of the rise. (Data of a larger bit width needs to be used to perform the computation with the same precision.) For example, when the zenith angle varies from 0 degrees to 1 degree in the vicinity of the zenith the variation in the distance from the optical axis is approximately $1.745 \times 10^{-2}$, while when the zenith angle varies from 89 degrees to 90 degrees in the vicinity of the rim, the variation in the distance from the optical axis is approximately $1.523 \times 10^{-4}$, so that the precision differs by a factor of about 100.

The coordinate computation device of the present invention has been made in an attempt to solve the problems described above, and has a feature that the precision of the computation does not vary greatly, even if the bit width of the data is not changed in the vicinity of the zenith or the rim.

Figure 10:
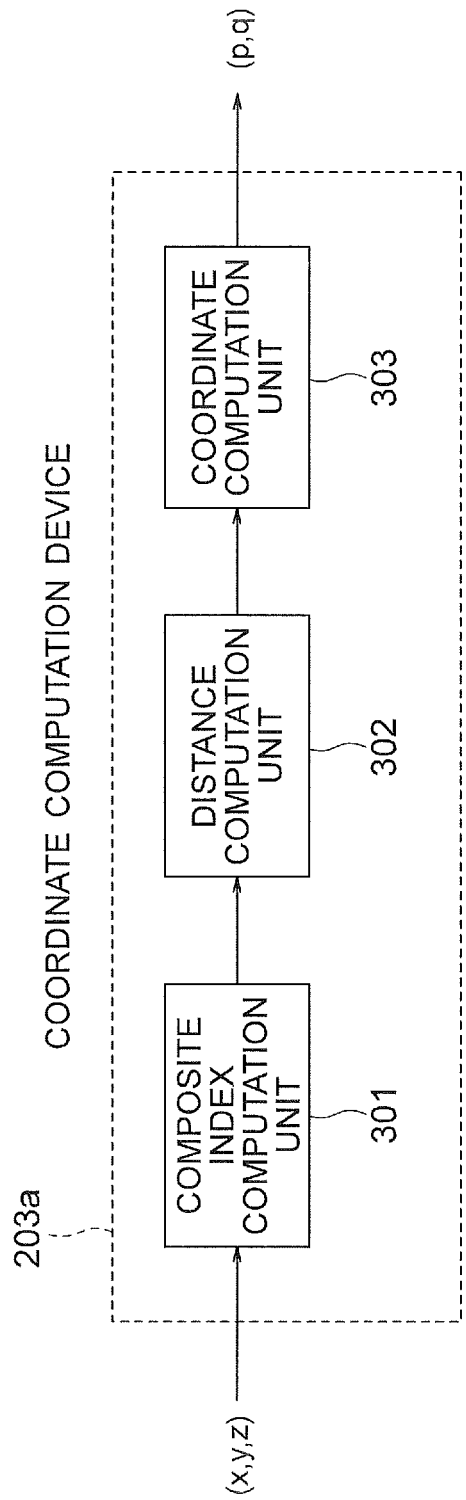
FIG. 10 is a block diagram showing a coordinate computation device in a first embodiment of the present invention.

FIG. 10 shows an example of the configuration of a coordinate computation device 203a. The illustrated coordinate computation device 203a is used as the fisheye image coordinate computation unit 203 in FIG. 7, and computes the coordinates in a two-dimensional image.

The coordinate computation device 203a in FIG. 10 has a composite index computation unit 301, a distance computation unit 302, and a coordinate computation unit 303.

The three-dimensional coordinates (x, y, z) representing the position on the projection sphere corresponding to the position of the pixel of interest in the output image are input to the coordinate computation device 203a. The three-dimensional coordinates (x, y, z) are obtained by selection, by means of the output range selection unit 201, of the range of extraction according to the pan angle α, the tilt angle β and the plane inclination angle ϕ, and the room magnification factor, and projection by means of the spherical coordinate computation unit 202, onto the projection sphere.

The three-dimensional coordinates (x, y, z) are input to the composite index computation unit 301.

The composite index computation unit 301 computes the composite index Rn which is a combination of the distance r from the optical axis:

$$r = \sqrt{(x^2 + y^2)} \quad (6)$$

and the height z, according to the following formulas (7a), (7b), (8a) and (8b):

if $$z \geq \sqrt{(x^2 + y^2)} \quad (7a)$$

then $$Rn = \sqrt{(x^2 + y^2)} \quad (7b)$$

and if $$z < \sqrt{=(x^2 + y^2)} \quad (8a)$$

then $$Rn = \sqrt{2} \times Rb - z \quad (8b)$$

z is equal to or greater than $\sqrt{(x^2 + y^2)}$ in the range in which the zenith angle θ is equal to or less than 45 degrees, so that the formulas (7a) and (8a) can be rewritten as the following formulas (7c) and (8c):

$$z \geq Rb/\sqrt{2} \quad (7c)$$

$$z < Rb/\sqrt{2} \quad (8c)$$

Figure 11:
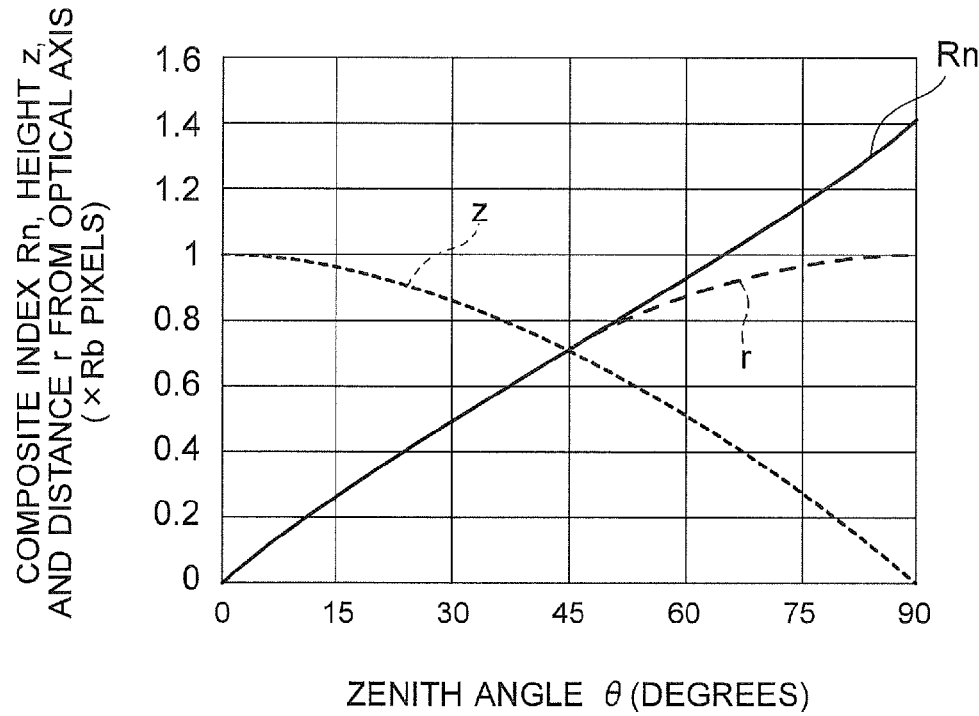
FIG. 11 is a graph showing a relationship between the zenith angle, and a composite index Rn, the height z, and the distance r from the optical axis, of a point of interest on the projection sphere.

FIG. 11 shows the relationships between the zenith angle (the angle formed by the line connecting the point of interest Ps and the original O, and the optical axis AL), and the composite index Rn, the height z and the distance r from the optical axis.

In FIG. 11, the horizontal axis represents the zenith angle θ of the point of interest Ps.

The composite index Rn, the height z, and the distance r from the optical axis are shown on the vertical axis.

As shown in FIG. 11, the slops of the height z becomes zero when the zenith angle is 0 degrees, so that the variation in the value of the height with respect to the zenith angle is small in the vicinity of 0 degrees, and a large bit width becomes necessary to carry out the computation using the height with high precision.

Also, the slope of the distance r from the optical axis becomes zero when the zenith angle θ is 90 degrees, so that the variation in the value of the distance r from the opt teal axis with respect to the zenith angle θ is small in the vicinity of 90 degrees, and a large bit width becomes necessary to carry out the computation with high precision by using the distance r from the optical axis.

In contrast, the slope of the composite index Rn does not vary so much, throughout the whole range of the zenith angle, so that the bit width need not be large.

Also, at the point where the height z and the distance r from the optical axis are equal (the boundary between the range within which the formula (7a) is satisfied and the range within which the formula (8a) is satisfied), Rn given by the formula (7b) and Rn given by the formula (8b) are equal, and the slope of Rn given by the formula (7b) and the slope of Rn given by the formula (8b), that is, the slope of $-z$, and the slope of r $(=\sqrt{(x^2+y^2)})$ are equal, so that the composite index Rn obtained by combining the two different parameters (z and r) varies continuously and smoothly.

The composite index Rn is sent to the distance computation unit 302.

The distance computation unit 302 determines the distance (image height) Rf of the point Pf from the origin in the fisheye image based on the composite index Rn, by computation represented by the following formulas. That is, if the image height Rf is represented by:

$$Rf=Rb\cdot R(\theta) \quad (9)$$

as a function of the radius Rb of the projection sphere and the zenith angle θ, then in the range in which $$z \geq \sqrt{(x^2+y^2)} \quad (7a)$$

is satisfied, the distance computation unit 302 determines Rf by:

[Mathematical Expression 2]

$$Rf = Rb \cdot F\left(\cos^{-1}\frac{\sqrt{Rb^2 - Rn^2}}{Rb}\right) \quad (10)$$

whereas in the range in which $$z < \sqrt{(x^2+y^2)} \quad (8a)$$

is satisfied, the distance computation unit 302 determines Rf by:

[Mathematical Expression 3]

$$Rf = Rb \cdot F\left(\cos^{-1}\frac{\sqrt{2} \times Rb - Rn}{Rb}\right) \quad (11)$$

The reason, why Rf is determined by the formula (10) and the formula (11) will be described below.

When the point Ps on the sphere is projected to the point Pf in the fisheye image, the image height Rf of the point Pf is represented as a function of Rb and the zenith angle θ;

$$Rf=Rb\cdot F(\theta) \quad (12)$$

In the case of the orthographic projection, for example, it is represented by:

$$Rf=Rb\cdot\sin(\theta) \quad (12a)$$

whereas in the case of the stereographic projection, it is represented by:

$$Rf=2Rb\cdot\tan(\theta) \quad (12b)$$

θ in the formula (12) is represented by:

$$\theta=\cos^{-1}(z/Rb) \quad (13)$$

From the formula (12) and the formula (13),

[Mathematical Expression 4]

$$Rf = Rb \cdot F\left(\cos^{-1}\frac{z}{Rb}\right) \quad (14)$$

is obtained.

Rb is related to x, y and z by:

$$Rb^2=x^2+y^2+z^2 \quad (15)$$

Accordingly, $$z^2=Rb^2-(x^2+y^2) \quad (16)$$

Also, the formula (7b) holds in the range in which the formula (7a) is satisfied, so that $$Rn^2=(x^2+y^2) \quad (17)$$

From the formula (17) and the formula (16), $$z^2=Rb^2-Rn^2 \quad (18)$$

Accordingly, $$z=\sqrt{(Rb^2-Rn^2)} \quad (19)$$

From the formula (14) and the formula (19),

[Mathematical Expression 5]

$$Rf = Rb \cdot F\left(\cos^{-1}\frac{\sqrt{Rb^2 - Rn^2}}{Rb}\right) \quad (10)$$

is obtained.

In the range in which the formula (8a) as satisfied, the formula (8b) holds, so that, $$z=\sqrt{2}\times Rb-Rn \quad (20)$$

From the formula (14) and the formula (20),

[Mathematical Expression 6]

$$Rf = Rb \cdot F\left(\cos^{-1} \frac{\sqrt{2} \times Rb - Rn}{Rb}\right) \quad (11)$$

is obtained,

From the above, it can be seen that Rf is given by the formula (10) when the formula (7a) is satisfied, and by the formula (11) when the formula (8a) is satisfied.

In the case of the orthographic projection, that is, when Rf is given by the formula (12a), $$Rf = Rb \cdot \sin(\cos^{-1}(z/Rb)) \quad (14a)$$

from the formula (12a) and the formula (13).

From the formula (14a) and the formula (19).

[Mathematical Expression 7]

$$Rf = Rb \cdot \sin\left(\cos^{-1} \frac{\sqrt{Rb^2 - Rn^2}}{Rb}\right) \quad (10a)$$

From the formula (14a) and the formula (20),

[Mathematical Expression 8]

$$Rf = Rb \cdot \sin\left(\cos^{-1} \frac{\sqrt{2} \times Rb - Rn}{Rb}\right) \quad (11a)$$

In the case of the stereographic projection, that is, when Rf is given by the formula (12b), $$Rf = 2Rb \cdot \tan(\cos^{-1}(z/Rb)) \quad (14b)$$

from the formula (12b) and the formula (13).

From the formula (14b) and the formula (19),

[Mathematical Expression 9]

$$Rf = 2Rb \cdot \tan\left(\cos^{-1} \frac{\sqrt{Rb^2 - Rn^2}}{Rb}\right) \quad (10b)$$

From the formula (14b) and the formula (20),

[Mathematical Expression 10]

$$Rf = 2Rb \cdot \tan\left(\cos^{-1} \frac{\sqrt{2} \times Rb - Rn}{Rb}\right) \quad (11b)$$

The coordinate computation unit 303 computes the two-dimensional coordinates (p, q) on the fisheye image, from the image height Rf computed by the formula (10) and the formula (11), and the three-dimensional coordinates (x, y, z) on the projection sphere. The formulas for the computation are as follows:

If $$Rf \neq 0 \quad (21Aa),$$

then $$p = x \times Rf/r \quad (21Ab)$$

$$q = y \times Rf/r \quad (21Ac)$$

If $$Rf = 0 \quad (21Ba),$$

then $$p = 0 \quad (21Bb)$$

$$q = 0 \quad (21Bc)$$

The case in which the image height Rf is determined by the computation represented by the formula (10) and the formula (11), in the distance computation unit 302 has been described above, but Rf may also be determined by using a lookup table storing the relationship between Rn and Rf.

In this case, if values of Rf were to be stored for all the values of Rn, a lookup table of a large capacity would be necessary. To avoid this, a lookup table storing values DF[0] to DF[N−1] of Rf corresponding to a plurality of, namely, N discrete representative values DN[0] to DN[N−1] of Rn may be provided, and Rf corresponding to Rn may be determined by interpolation computation using the value of Rn, the nearest representative value DN[n] which is not greater than Rn, the nearest representative value DN[n+1] which is greater than Rn, and output values DF[n], DF[n+1] read out when DN[n], DN[n+1] are input. The computational formula used in that case is shown as the formula (22).

[Mathematical Expression 11]

$$Rf = DF[n] + \frac{(DF[n+1] - DF[n])}{(Dn[n+1] - DN[n])} \times (Rn - DN[n]) \quad (22)$$

Here, the input values DN[0] to DN[N−1] are such that they monotonically increase with respect to increase in n (n=0 to N−1) That is, DN[0] to DN[N−1] are mutually interrelated by the formula below.

$$DN[n] \leq DN[n+1] \quad (23)$$

(where, n is any value from 0 to N−2).

n in the formula (22) satisfies the condition represented by the following formula (24).

$$DN[n] \leq Rn < DN[n+1] \quad (24)$$

Incidentally, when Rn is equal to or greater than DN[N−1] then DF[N−1] is output as Rf.

In general, the N values of the above-mentioned DN[n] and DF[n] are set within the range of values that can be taken by Rn and Rf in such a way that the relationship between Rn and Rf can be approximated by a polyline, using the formula (10) in the range in which the condition of the formula (7a) is satisfied and using the formula (11) in the range in which the condition of the formula (8a) is satisfied, and in such a way that, for example, the differences between DN[n] and DN[n+1] are constant.

When the orthographic projection is used, the formula (10a) and the formula (11a) are used as the formula (10) and the formula (11), whereas when the stereographic projection is used, the formula (10b) and the formula (10b) are used as the formula (10) and the formula (11).

Incidentally, when the relationship between Rn and Rf cannot be expressed by a computational formula, the relationship between Rn and Rf is determined by measurement. For example, the relationship between Rn and Rf can be determined by photographing a two-dimensional square grid chart, or the like by use of the fisheye lens, and investigating the amount of distortion of the square grid on the photographed image.

The present invention has been described above as a coordinate computation device and an image processing device equipped with the coordinate computation device, but a coordinate computation method and an image processing method implemented by these devices also form part of the present invention.

Second Embodiment

Figure 12:
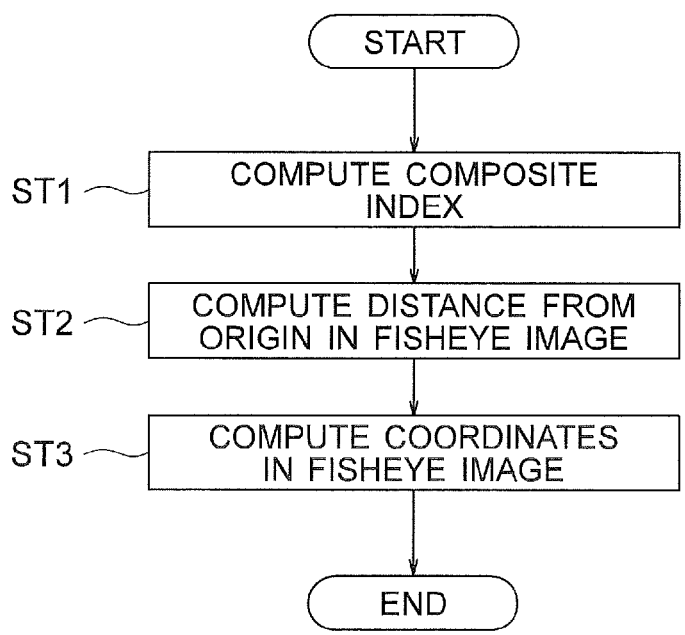
FIG. 12 is a flowchart showing the processing procedure in a coordinate computation method in a second embodiment of the present invention.

FIG. 12 shows a processing procedure in the coordinate computation method implemented by the coordinate computation device in FIG. 10.

In a step ST1 in FIG. 12, a composite index Rn which is a combination of the height and the distance from the optical axis is computed from the three-dimensional coordinates (x, y, z) on the projection sphere, according to the formula (7a), the formula (7b), the formula (8a), and the formula (8b) shown in the first embodiment.

Next, in a step ST2, the distance Rf from the origin in the fisheye image is computed from the composite index Rn.

This process may implemented by performing the computation represented by the formula (10) and the formula (11), or may be implemented by use of a lookup table.

Next, in a step ST3, the two-dimensional coordinates (p, q) on the fisheye image are computed from the distance Rf from the origin in the fisheye image, and the three-dimensional coordinates (x, y, z) on the projection sphere, according to the formulas (21Aa) to (21Bc) shown in the first embodiment.

By transforming the three-dimensional coordinates on the projection sphere to the two-dimensional coordinates on the fisheye image, using the above-described method, the transformation can be made with high precision and with a small bit width.

The coordinate computation method, shown in FIG. 12 may be implemented by software, that is, by a programmed computer.

The present invention has been described above for the case in which part of a fisheye image is selected and transformed to an image of a perspective projection method, but the invention may be applied to processes other than that described above, for example, the present invention may be applied to a process for obtaining a panoramic image from a fisheye image.

The case in which a circular distorted image is obtained by use of a fisheye lens has been described above, but the present invention may also be applied where an annular distorted image is obtained.

The coordinate computation device according to the present invention or the image processing device equipped with the coordinate computation device may be utilized in a surveillance system.

REFERENCE CHARACTERS

201 output range selection unit; 202 spherical coordinate-computation unit; 203 fisheye image coordinate computation unit; 203a coordinate computation device; 204 pixel value computation unit; 301 Composite index computation unit 302 distance computation unit; 303 coordinate computation unit.

What is claimed is:

1. A coordinate computation device that transforms three-dimensional coordinates on a projection sphere to two-dimensional coordinates on a distorted image, comprising:
    a composite index computation unit for computing a composite index which is a combination of a height of a point of interest on the projection sphere and a distance of the point of interest from an optical axis which are obtained from said three-dimensional coordinates;
    a distance computation unit for computing a distance from an origin in said distorted image, of a point in said distorted image corresponding to said point of interest, from said composite index; and
    a coordinate computation unit for computing the two-dimensional coordinates in said distorted image, from the distance from said origin in said distorted image,
    wherein, when said three-dimensional coordinates are represented by (x, y, z), and a radius of said projection sphere is denoted by Rb, said composite index computation unit determines said composite index Rn according to:

$$Rn = \sqrt{(x^2+y^2)} \text{ if } z \geq \sqrt{(x^2+y^2)}, \text{ and}$$

$$Rn = \sqrt{2 \times Rb - z} \text{ if } z < \sqrt{(x^2+y^2)}.$$

2. The coordinate computation device as set forth in claim 1, wherein, when a zenith angle on said projection sphere is denoted by θ, and the distance from said origin of said corresponding point in said distorted image is denoted by Rf, said distance computation unit determines the distance Rf from said origin, according to:

[Mathematical Expression 12]

$$Rf = Rb \cdot F\left(\cos^{-1}\frac{\sqrt{Rb^2 - Rn^2}}{Rb}\right)$$

in a range in which $$z \geq \sqrt{(x^2+y^2)}$$

is satisfied, and according to:

[Mathematical Expression 13]

$$Rf = Rb \cdot F\left(\cos^{-1}\frac{\sqrt{2} \times Rb - Rn}{Rb}\right)$$

in a range in which $$z < \sqrt{(x^2+y^2)}$$

is satisfied.

3. The coordinate computation device as set forth in claim 2, wherein said coordinate computation unit determines said two-dimensional coordinates (p, q), according to:

$$p = x \times Rf/\sqrt{(x^2+y^2)}$$

$$q = y \times Rf/\sqrt{(x^2+y^2)}$$

if Rf≠0; and according to:
  p=0
  q=0
if Rf=0.

4. The coordinate computation device as set forth in claim 1, wherein said distance computation unit
has a lookup table storing a relationship between an input value DN and an output value DF which approximates, by a polyline, a relationship between said composite index Rn and the distance Rf from said origin, finds, based on said composite index Rn computed by said composite index computation unit, DN[n], DN[n+1] satisfying $$DN[n] \leq Rn < DN[n+1],$$

reads output values DF[n], DF[n+1] corresponding to DN[n], DN[n+1], and
determines the distance Rf from said origin according to:

[Mathematical Expression 14]

$$Rf = DF[n] + \frac{(DF[n+1]-DF[n])}{(Dn[n+1]-DN[n])} \times (Rn - DN[n]).$$

5. The coordinate computation device as set forth in claim 4, wherein said coordinate computation unit determines said two-dimensional coordinates (p, q), according to:

$$p = x \times Rf/\sqrt{(x^2+y^2)}$$

$$q = y \times Rf/\sqrt{(x^2+y^2)}$$

if Rf≠0; and according to:
  p=0
  q=0
if Rf=0.

6. An image processing device having:
a coordinate computation device as set forth in claim 1;
a spherical coordinate computation unit for taking each pixel in the output image as a pixel of interest, and computing the three-dimensional coordinates on said projection sphere corresponding to coordinates of the pixel of interest;
a pixel value computation unit for computing a pixel value of said pixel of interest in said output image, based on the two-dimensional coordinates in said distorted image computed by said coordinate computation device; wherein
said coordinate computation device determines the two-dimensional coordinates representing a position in said distorted image corresponding to the three-dimensional coordinates computed by said spherical coordinate computation unit, as the coordinates representing a position corresponding to the coordinates of said pixel of interest; and
if there is a pixel at the position in said distorted image corresponding to the coordinates of said pixel of interest, said pixel value computation unit uses a pixel value of the pixel at said corresponding position, as the pixel value of said pixel of interest; and
if there is no pixel at the position in said distorted image corresponding to the coordinates of said pixel of interest, said pixel value computation unit determines the pixel value of said pixel of interest by interpolation from a pixel value or pixel values of one or more pixels in the neighborhood of said corresponding position.

7. A coordinate computation method that transforms three-dimensional coordinates on a projection sphere to two-dimensional coordinates on a distorted image, comprising:
a composite index computation step for computing a composite index which is a combination of a height of a point of interest on the projection sphere and a distance of the point of interest from an optical axis which are obtained from said three-dimensional coordinates;
a distance computation step for computing a distance from an origin in said distorted image, of a point in said distorted image corresponding to said point of interest, from said composite index; and
a coordinate computation step for computing the two-dimensional coordinates in said distorted image, from the distance from said origin in said distorted image,
wherein, when said three-dimensional coordinates are represented by (x, y, z), and a radius of said projection sphere is denoted by Rb, said composite index computation step determines said composite index Rn according to:

$$Rn = \sqrt{(x^2+y^2)} \text{ if } z \geq \sqrt{(x^2+y^2)}, \text{ and}$$

$$Rn = \sqrt{2 \times Rb - z} \text{ if } z < \sqrt{(x^2+y^2)^2}.$$

8. An image processing method comprising:
said composite index computation step, said distance computation step, and said coordinate computation step constituting the coordinate computation method as set forth in claim 7;
a spherical coordinate computation step for taking each pixel in the output image as a pixel of interest, and computing the three-dimensional coordinates on said projection sphere corresponding to coordinates of the pixel of interest;
a pixel value computation step for computing a pixel value of said pixel of interest in said output image, based on the two-dimensional coordinates in said distorted image computed in said coordinate computation step; wherein
said coordinate computation step determines the two-dimensional coordinates representing a position in said distorted image corresponding to the three-dimensional coordinates computed in said spherical coordinate computation step, as the coordinates representing a position corresponding to the coordinates of said pixel of interest; and
if there is a pixel at the position in said distorted image corresponding to the coordinates of said pixel of interest, said pixel value computation step uses a pixel value of the pixel at said corresponding position, as the pixel value of said pixel of interest; and
if there is no pixel at the position in said distorted image corresponding to the coordinates of said pixel of interest, said pixel value computation step determines the pixel value of said pixel of interest by interpolation from a pixel value or pixel values of one or more pixels in the neighborhood of said corresponding position.

* * * * *